US012182823B2

(12) United States Patent
Anasta et al.

(10) Patent No.: US 12,182,823 B2
(45) Date of Patent: Dec. 31, 2024

(54) SERVICE MANAGEMENT SYSTEM FOR PROCESSING A REQUEST

(71) Applicant: Capital One Services, LLC, McLean, VA (US)

(72) Inventors: Jude Pierre Anasta, Hudson, NY (US); Abdelkader M'Hamed Benkreira, Brooklyn, NY (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 287 days.

(21) Appl. No.: 17/302,783

(22) Filed: May 12, 2021

(65) Prior Publication Data

US 2022/0366425 A1    Nov. 17, 2022

(51) Int. Cl.
| | |
|---|---|
| *G06Q 30/016* | (2023.01) |
| *G06F 16/2457* | (2019.01) |
| *G06Q 10/06* | (2023.01) |
| *G06Q 10/10* | (2023.01) |
| *G06Q 10/109* | (2023.01) |
| *G06Q 30/02* | (2023.01) |

(Continued)

(52) U.S. Cl.
CPC ..... *G06Q 30/016* (2013.01); *G06F 16/24578* (2019.01); *G06Q 10/109* (2013.01); *G06Q 20/1085* (2013.01); *G06Q 20/18* (2013.01); *G06Q 20/326* (2020.05); *G06Q 20/4016* (2013.01); *G06Q 40/02* (2013.01); *H04L 67/60* (2022.05)

(58) Field of Classification Search
CPC ............... G06Q 30/016; G06Q 10/109; G06Q 20/1085; G06Q 20/18; G06Q 20/326; G06Q 20/4016; G06Q 40/02; G06F 16/24578; G06F 16/9535; H04L 67/60; H04L 67/535; H04L 67/02; H04L 67/306
USPC .......................................... 705/1.1–912, 304
See application file for complete search history.

(56) References Cited

U.S. PATENT DOCUMENTS

| | | | |
|---|---|---|---|
| 7,373,410 B2 * | 5/2008 | Monza | H04L 69/24 709/229 |
| 7,865,386 B2 | 1/2011 | Sarkar | |

(Continued)

OTHER PUBLICATIONS

Mahadevan, Lakshman; Kettinger, William J. E, "Service Oriented Architecture as a Dynamic Enabler of Customer Prioritization", Service Journal 7.2: 28-45,100-101. Bloomington: Indiana University Press. (Winter 2010) (Year: 2010).*

*Primary Examiner* — Jonathan P Ouellette
(74) *Attorney, Agent, or Firm* — Harrity & Harrity, LLP

(57) ABSTRACT

In some implementations, a system may receive a request to facilitate a service interaction involving a user. The system may determine, based on receiving the request, a priority factor associated with facilitating the service interaction for the user. The priority factor may be determined based on account activity information associated with a user account of the user. The system may determine, based on the priority factor and service information, a priority score associated with facilitating the service interaction. The system may select, based on the priority score, a queue location of a queue. The queue may be associated with a provider system that is configured to facilitate the service interaction. The system may perform an action associated with causing the provider system to facilitate the service interaction according to the queue location.

20 Claims, 8 Drawing Sheets

(51) Int. Cl.
  *G06Q 30/06* (2023.01)
  *G06Q 20/10* (2012.01)
  *G06Q 20/18* (2012.01)
  *G06Q 20/32* (2012.01)
  *G06Q 20/40* (2012.01)
  *G06Q 40/02* (2023.01)
  *H04L 67/60* (2022.01)

(56) References Cited

U.S. PATENT DOCUMENTS

| | | | |
|---|---|---|---|
| 8,073,725 B2 | 12/2011 | Loring et al. | |
| 8,244,566 B1 | 8/2012 | Coley et al. | |
| 10,009,469 B1* | 6/2018 | Varman | H04M 3/5235 |
| 10,326,876 B1* | 6/2019 | Gailloux | H04M 3/2227 |
| 10,348,904 B1* | 7/2019 | Howard | H04M 3/5233 |
| 10,469,664 B2* | 11/2019 | Pirat | H04M 3/58 |
| 10,657,589 B2 | 5/2020 | Acharya et al. | |
| 10,726,393 B2 | 7/2020 | Kaufman | |
| 10,733,576 B2 | 8/2020 | Yu et al. | |
| 2005/0233733 A1* | 10/2005 | Roundtree | G06F 9/454 |
| | | | 455/414.1 |
| 2010/0228564 A1 | 9/2010 | Kharraz Tavakol et al. | |
| 2015/0235240 A1* | 8/2015 | Chang | H04M 3/5166 |
| | | | 705/7.29 |
| 2016/0127536 A1* | 5/2016 | Jayapalan | H04L 63/1408 |
| | | | 379/265.02 |
| 2016/0127557 A1* | 5/2016 | McCormack | G06Q 10/06 |
| | | | 379/265.12 |
| 2017/0111505 A1* | 4/2017 | McGann | H04M 3/5191 |
| 2018/0374029 A1* | 12/2018 | Henry | G06N 20/20 |
| 2020/0410378 A1* | 12/2020 | Williams | G06N 3/08 |
| 2021/0306461 A1* | 9/2021 | Scott | G06N 20/00 |

* cited by examiner

```
500 ──▶
```

510 — Maintain account activity information associated with one or more previous service interactions involving a user of a user account

520 — Determine, based on account activity information, a priority factor associated with facilitating a service interaction involving the use

530 — Receive a request to facilitate the service interaction involving the user

540 — Determine, based on the priority factor and the service information, a priority score associated with facilitating the service interaction

550 — Select, based on the priority score, a queue location of a queue

560 — Perform an action associated with causing the provider system to facilitate the service interaction according to the queue location

FIG. 5

SERVICE MANAGEMENT SYSTEM FOR PROCESSING A REQUEST

BACKGROUND

A queue, such as a processing queue, may facilitate or enable scheduling or arranging an order in which a unit, object, or data is processed. Various schemes may be used to manage the queue, such as a first in-first out scheme, a last-in first out, a prioritization scheme, and/or other types of schemes.

SUMMARY

In some implementations, a system for managing a queue for providing a service includes one or more memories, and one or more processors, communicatively coupled to the one or more memories, configured to: maintain account activity information associated with one or more previous service interactions involving a user of a user account; determine, based on the account activity information, a priority factor associated with facilitating a service interaction involving the user, wherein the priority factor is indicative of an ability of the user to engage in the service interaction via a particular type of interface; receive a request to facilitate the service interaction involving the user, wherein the request includes service information that identifies that the service is to be provided in association with the service interaction; determine, based on the priority factor and the service information, a priority score associated with facilitating the service interaction; select, based on the priority score, a queue location of the queue, wherein the queue is used to facilitate service interactions with one or more other users via a provider system; and perform an action associated with causing the provider system to facilitate the service interaction according to the queue location.

In some implementations, a method for managing a queue for providing a service includes receiving a request to facilitate a service interaction involving a user, wherein the request includes service information that identifies that the service is to be provided in association with the service interaction; determining, based on receiving the request, a priority factor associated with facilitating the service interaction for the user, wherein the priority factor is determined based on account activity information associated with a user account of the user, wherein the priority factor is indicative of at least one of a degree of fraud risk associated with one or more event records of the user account, or a degree of adverse risk to a standing of the user account; determining, based on the priority factor and the service information, a priority score associated with facilitating the service interaction; selecting, based on the priority score, a queue location of the queue, wherein the queue is associated with a provider system that is configured to facilitate the service interaction; and performing an action associated with causing the provider system to facilitate the service interaction according to the queue location.

In some implementations, a non-transitory computer-readable medium storing a set of instructions includes one or more instructions that, when executed by one or more processors of a device, cause the device to: receive a request to facilitate a service interaction involving a user of a user account, wherein the request includes service information that identifies that a service is to be provided in association with the service interaction; determine, based on previous service interactions involving the user, a first priority factor for facilitating the service interaction; determine, based on event records associated with the user account, a second priority factor for facilitating the service interaction; select, based on the first priority factor, a queue associated with a provider system that is configured to facilitate the service interaction; select, based on the second priority factor, a queue location of the queue; and cause the provider system, associated with the queue, to facilitate the service interaction according to the queue location.

BRIEF DESCRIPTION OF THE DRAWINGS

FIG. 5 is a flowchart of an example process relating to a service management system for processing a request.

DETAILED DESCRIPTION

Figure 1A:
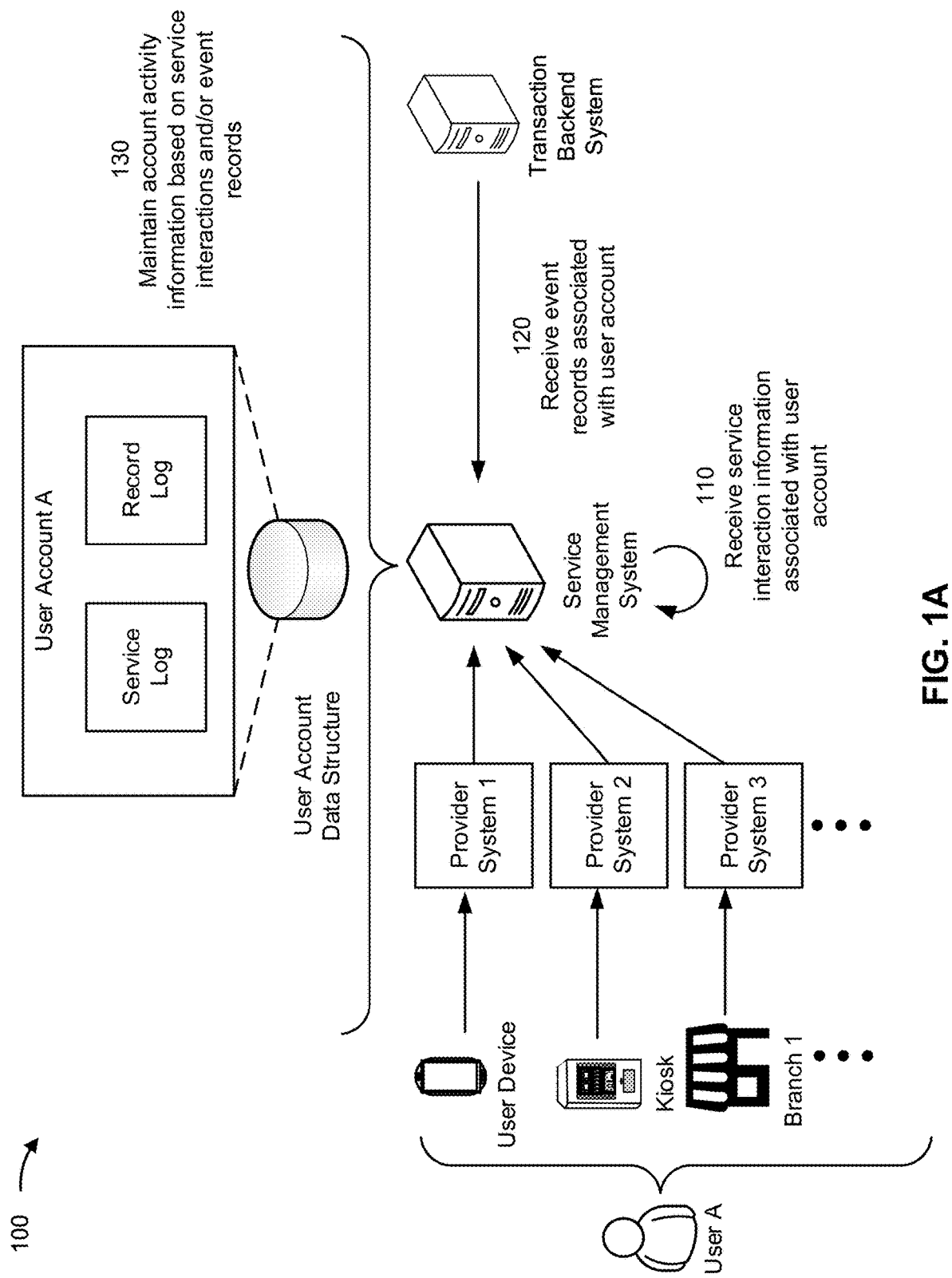
FIGS. 1A-1B are diagrams of an example implementation relating to maintaining information for a service request system described herein.

The following detailed description of example implementations refers to the accompanying drawings. The same reference numbers in different drawings may identify the same or similar elements.

Requests for a service may be processed through a variety of different systems, platforms, and/or service interactions. For example, a service interaction to provide the service to a user or help facilitate a service for the user may involve use of a phone system, a chat system, an application-based system (e.g., using an application of a user device), a self-service system or kiosk, and/or in-person interactions, which may utilize one or more systems for scheduling or arranging a service interaction. However, in many instances, service providers can be occupied with requests for service interactions and/or requested to engage in interactions that are time consuming, involve inefficient use of resources (regardless of the system or platform that is utilized), and/or realistically provide little benefit to the user (despite the user believing that such a benefit exists) or the service provider. Accordingly, some systems may prioritize which users or service requests should be prioritized over others (e.g., based on a level of a user's relationship with the service provider and/or based on a value or business opportunity associated with a service or product that is a subject of the request).

However, in some instances, if one type of provider system is overloaded or designated only for high priority matters, another provider system may still be available to provide or facilitate a same or similar level of service for a user (e.g., depending on the type of the service). Additionally, or alternatively, the service provider may prefer that a user utilize a particular provider system over another because the particular provider system may be more efficient and/or may be more cost effective than the other. Accordingly, although a user may request that a particular type of service interaction is requested for providing a service, a service provider may identify that another type of service interaction may be better suited for the user (e.g., because the other type of service interaction is more readily available to the user, because the other type of service interaction is faster, more efficient, and/or less costly than the requested service interaction, and/or the like). However, typically, some considerations that may be unique to a particular user may not be considered ahead of rejecting a user's request for a particular service interaction and/or suggesting that the user try another service interaction. For example, certain users may be incapable of engaging in certain phone calls (e.g., due to a hearing disability and/or poor telephone service), may not have access to an application used to facilitate a particular service interaction (e.g., due to not having a user device that is capable of hosting the application, due to lack of knowledge surrounding the application, and/or lack of interest in using the application), and/or may not be near or within a reasonable distance of a self-service kiosk, among other examples. Additionally, or alternatively, certain users may be requesting under certain conditions (e.g., risk of fraud to the user account of the user and/or an adverse risk to a standing of the user account) a particular service interaction to receive a service. In such a case, these certain conditions typically should involve a particular type of service interaction (e.g., a type of service interaction that is requested), despite that particular type of service interaction ordinarily being undesirable for providing the requested service.

Some implementations described herein provide a service management system that analyzes account activity information (e.g., associated with historical events or previous service interactions involving the user) to determine which provider system is capable of facilitating a particular service interaction to provide a service (e.g., despite that provider system being different from a provider system that is requested by the user). In some implementations, the service management system identifies, based on specific historical information that is associated with the user, whether a particular user is capable of engaging in a particular type of service interaction and/or if that type of service interaction is preferred (e.g., by the user and/or the service provider) over a requested service interaction to provide a service. Additionally, or alternatively, the service management system may determine, based on receiving a request for a particular service interaction, one or more risks to the user account ahead of scheduling and/or designating a particular provider system for facilitating the service interaction. In this way, rather than wasting computing resources (e.g., processor resources and/or memory resources) and/or network resources on requesting, suggesting, or requiring that a user utilize a particular service platform that the user is incapable of using or that may be unsuccessful in addressing certain risks associated with the user, the service management system may identify a provider system that is most likely to meet the needs of both the user and the service provider. Accordingly, the service management system may improve a user experience with respect to engaging in or scheduling a service interaction.

Figure 1B:
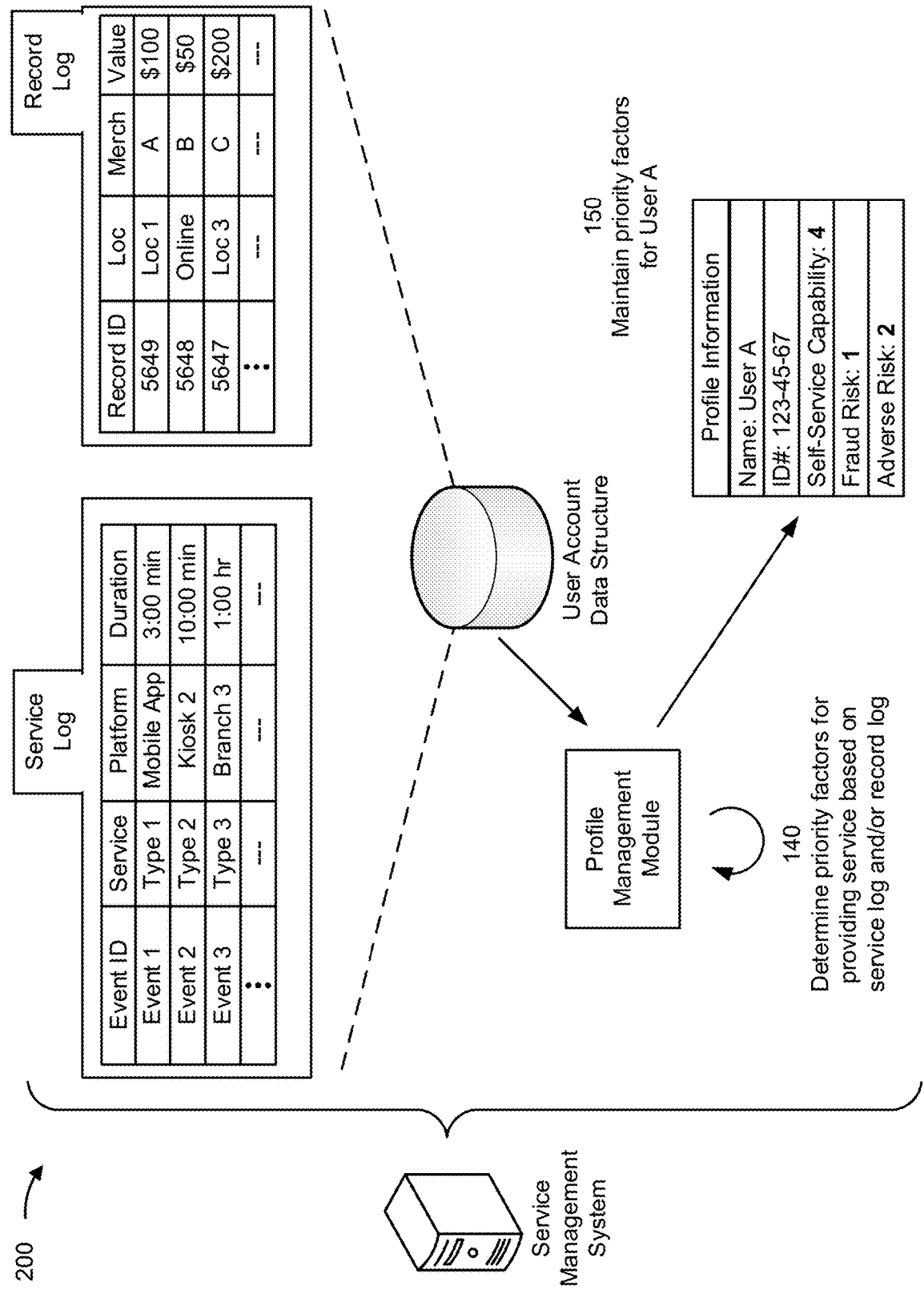

FIGS. 1A-1B are diagrams of an example implementation 100 associated with maintaining information for a service request system. As shown in FIGS. 1A-1B, example implementation 100 includes a service management system, provider systems (e.g., that are associated with a user device, a kiosk, and/or a branch location), and a transaction backend system. These devices are described in more detail below in connection with FIG. 3 and FIG. 4. As described herein, the service management system, the one or more provider systems, and/or an application installed on the user device to facilitate a service interaction may be associated with a service provider (e.g., an individual and/or organization) that is configured to provide one or more services for the user (e.g., financial services, product services, warranty services, retail services, transportation services, and/or other types of services).

As shown in FIG. 1A, and by reference number 110, the service management system receives service interaction information that is associated with a user account. For example, the service management system may receive historical data that identifies previous service interactions between a user of the user account (shown as User A) and the service provider. The service interaction information may identify dates and/or times of previous service interactions, types of services that were involved and/or provided via the service interactions, types of interfaces of provider systems that were utilized to facilitate the service interactions, and/or the like. The interfaces of the provider system may be technical interfaces (e.g., user interfaces and/or device-specific interfaces) and/or non-technical interfaces (e.g., in-person meetings).

The service management system may receive and/or obtain the service interaction information based on monitoring and/or collecting information from the user and/or from the service provider in association with a service interaction being performed (e.g., via a related survey and/or via a related notification). Additionally, or alternatively, the service management system may monitor one or more of the provider systems, identify ongoing service interactions via the individual provider systems, obtain identifiers of user accounts involved in the service interactions, and record and/or store the service interactions within a user account data structure, as shown. More specifically, the service management system may store the service interaction information in a service log associated with a user account of User A (shown as User Account A).

As further shown in FIG. 1A, and by reference number 120, the service management system receives event records that are associated with the user account. For example, the service management system may receive the event records based on occurrences of events associated with the event records. In some implementations, an event may correspond to an occurrence of a transaction involving User A, via a user account, and the service provider. For example, the service provider may facilitate the transaction via the transaction backend system (e.g., by releasing and/or transferring funds from the user account to another account) in association with the user account.

As an example, the service provider may be a banking institution and the application may be a banking application. Correspondingly, User A may be subscribed to the banking application via the user account. Accordingly, when User A engages in a transaction using the user account, such as a transaction for goods and/or services, the service management system may generate and store an event record associated with the purchase in a record log of User Account A. The service management system may maintain the event record in the record log of User A. In example implementation 100, the user account of User A may correspond to a transaction account, such as a checking account, a savings account, a credit account, or other type of financial account.

As further shown in FIG. 1A, and by reference number 130, the service management system maintains account activity information based on the service interactions and the event records. The account activity information may correspond to the service information that is associated with previous service interactions between User A and the service provider and/or event records involving one or more transactions involving the user account of User A.

As shown in FIG. 1B, and by reference number 140, the service management system determines one or more priority factors for facilitating a service interaction. For example, the service management system may determine, based on the account activity information, a priority factor based on one or more previous service interactions identified in the service log and/or one or more event records of the record log. The priority factor may be associated with facilitating a service interaction involving the user. In some implementations, the priority factor is indicative of an ability of the user to engage in the service interaction via a particular type of interface based on whether the particular type of interface includes or involves an application of the user device, a web browser of the user device, and/or the kiosk. In this way, the priority factor may be indicative of whether User A is capable of performing the service, themselves (e.g., whether the service and/or User A have a self-service capability), and/or performing the service via a particular type of interface without a service interaction involving the service provider.

In some implementations, the service management system may determine the priority factor, as a first priority factor of a plurality of priority factors, based on service interaction information. The service interaction information may be stored in the service log and identify previous service interactions that may be indicative of whether a user is capable of engaging in corresponding service interactions.

Additionally, or alternatively, one or more other priority factors may be determined, as described herein. For example, the service management system may determine a service factor associated with a fraud risk and/or an adverse risk to a standing of the user account (e.g., a recent or impending event that may negatively affect the standing of the user account). In such a case, the service management system may determine, as a second priority factor of the plurality of priority factors, whether there is fraud risk or adverse risk based on the event records associated with the user account (e.g., transaction records in the record log).

The service management system may detect fraud from the event records according to any suitable fraud detection technique (e.g., based on suspicious transactions, based on suspicious transaction locations, based on suspicious merchants involved in the transactions, and/or the like). Additionally, or alternatively, the service management system may detect an adverse risk to a user account based on one or more event records or the record log indicating that events in the record log are going to cause and/or introduce negative impacts to the standing of the user account (e.g., indicating a delinquency and/or indicating that the user account dropped to a lower customer relationship tier associated with the service provider). Such adverse risk (a degree of an adverse risk) may be based on a transaction occurring after a designated date (e.g., a payment after a payment due date) and/or based on an impending due date without an event record existing in the record log to satisfy the due date).

As further shown in FIG. 1B, and by reference number 150, the service management system maintains the priority factors for User A. For example, as shown, the service management system may store the priority factors in a profile or as profile information of User A. More specifically, as shown, a priority factor involving a self-service capability may be determined to be (or scored as) a "4," a priority factor involving a degree of fraud risk may be determined to be "1," and a priority factor involving a degree of adverse risk may be determined to be "2" (e.g., one or more of which may be on a scale, such as 0-5 or 0-10).

In some implementations, a particular priority factor may be specific to the provider system. For example, one priority factor for facilitating an in-person service interaction may be different than a priority factor for User A to utilize a telephone service interaction. In such a case, the provider system may be accessible via a particular type of interface that is monitored by the service management system in association with providing a particular type of service and/or facilitating a particular type of service interaction.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2A:
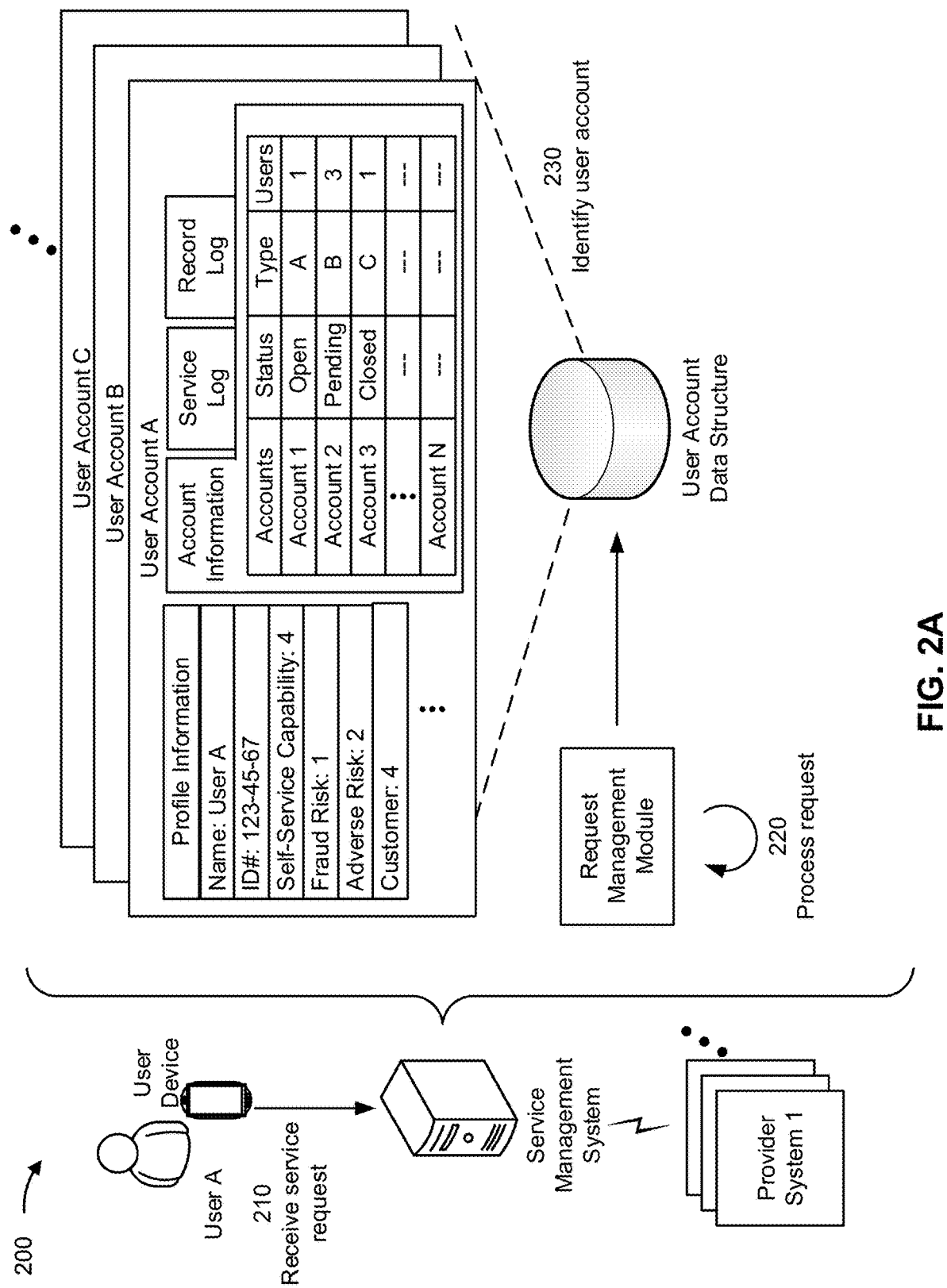
FIGS. 2A-2C are diagrams of an example implementation relating to a service management system for processing a request.
Figure 2B:
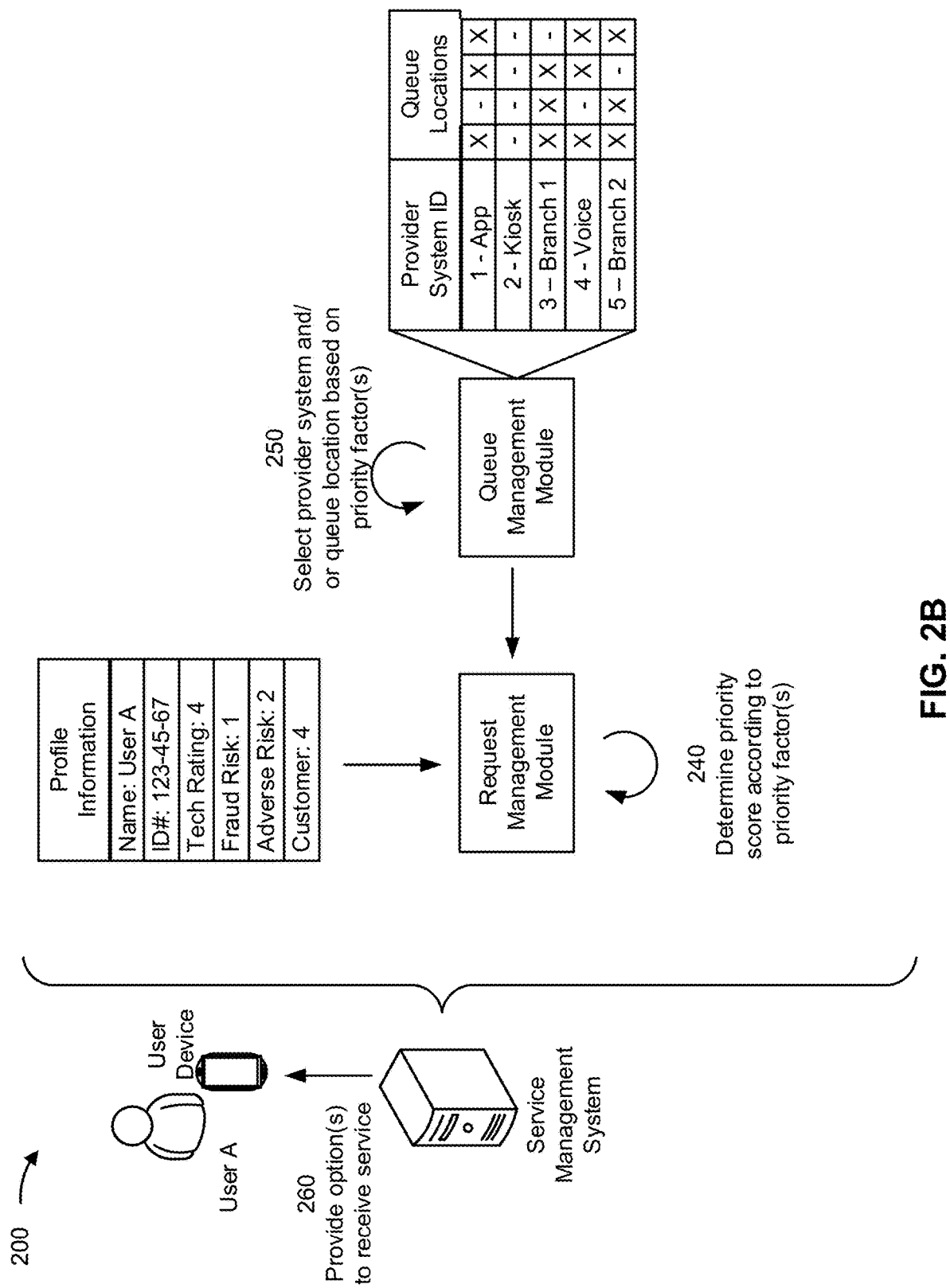
Figure 2C:
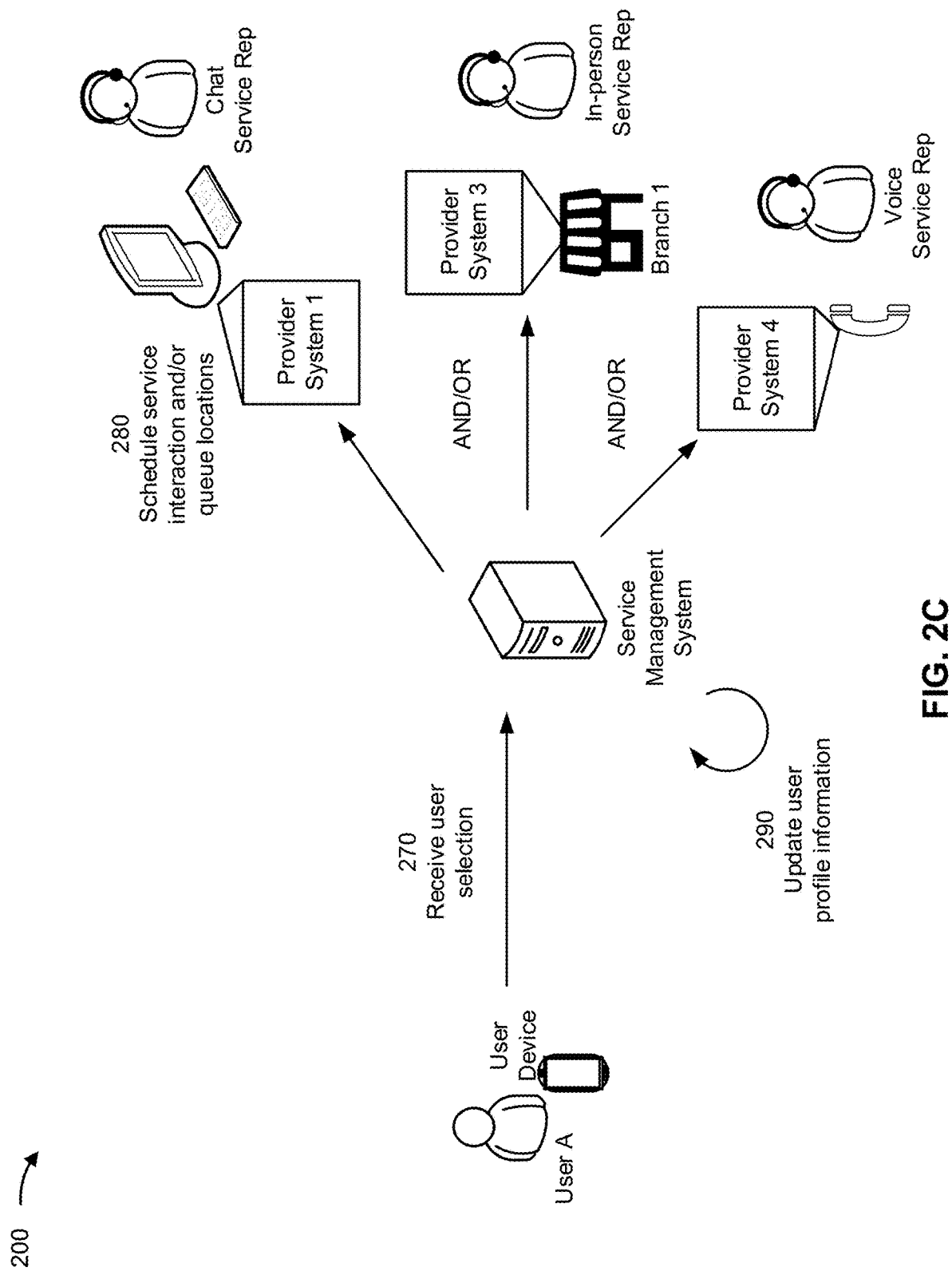

FIGS. 2A-2C are diagrams of an example implementation 200 associated with a service management system for processing a request. As shown in FIGS. 2A-2C, example implementation 200 includes a service management system, a user device, and one or more provider systems. These devices are described in more detail below in connection with FIG. 3 and FIG. 4. In example implementation 200, the service management system identifies a user (and/or user account) associated with a service request, analyzes profile information associated with the user and/or service information associated with the service request, and selects a queue and/or a queue location of a provider system that is to facilitate and/or perform the service interaction.

As shown in FIG. 2A, and by reference number 210, the service management system receives a service request. For example, the service request may correspond to a request that the service provider facilitate a service interaction involving the user (User A). The request may include any suitable message and/or notification (e.g., a text message, a chat message of an instant message interface, an audio message, a video message, a voice call, and/or an electronic mail message, among other examples).

The request may include information that identifies User A (e.g., a name of User A and/or an account identifier of User Account A). Additionally, or alternatively, the request may include service information that identifies a service and/or a service type that is to be provided to the user, by the service provider, during or in association with the service interaction. For example, referring to the banking application example described above, the service may include obtaining a confirmation that a deposit or payment was processed, depositing funds to the user account, paying another account with funds from the user account, applying for a loan with the banking institution, and/or the like.

As further shown in FIG. 2A, and by reference number 220, the service management system processes the service request. For example, the service management system may process the service request via a request management module that serves as an interface or request receiving module of the service management system. The request management module may utilize any suitable technique to process the request to identify and/or interpret the service information, user information, and/or other types of information associated with the request. For example, the service management system may utilize one or more of a natural language processing technique, an optical character recognition technique, a speech-to-text technique, a parsing technique, a sentiment analysis, and/or the like. In some implementations, the request management module may include and/or be associated with a chatbot, a voice call system, a call service system, a touchtone service system, and/or the like. The service management system may process the service request to identify the user, to identify a type of service that is to be provided to the user, and/or to identify a type of service interaction that is being requested by the user.

As further shown in FIG. 2A, and by reference number 230, the service management system identifies the user account. For example, based on processing the request and/or identifying an identifier of User A, the request management module may identify information and/or data associated with User Account A in the user account data structure. Correspondingly, as shown, the request management module may access the profile information of User A (including one or more learned priority factors associated with User A), account information associated with User A that identifies one or more accounts of user A, the service log of User A, and the record log of User A. In some implementations, the service management system may determine and/or update one or more of the priority factors (e.g., a self-service capability score, a degree of fraud risk, an adverse risk, and/or a customer score associated with a relationship between User A and the service provider) based on receiving the service request. In such a case, the service management system may determine and/or obtain a most up-to-date priority factor for the user that is based on the most recent or largest amount of available account activity information (e.g., relative to periodically or randomly determining and/or updating the priority factors).

As shown in FIG. 2B, and by reference number 240, the service management system determines a priority score according to one or more of the priority factors. For example, the request management module may determine the priority score based on a combination of one or more of the priority factors. The priority score may be specific to a particular provider system and/or based on a particular type of interface of the provider system (e.g., a particular provider system and/or type of interface that was requested or identified in the request for the service interaction). Accordingly, the priority score may be indicative of a priority that is to be assigned to the user in association with facilitating the service interaction via a particular provider system and/or via a particular interface of the provider system. The priority may be relative to other users of the provider system (e.g., other users that have requested to utilize the provider system to facilitate service interactions and/or other users that were allocated queue locations of the provider system to receive and/or engage in service interactions.

In some implementations, to determine the priority score, the request management module can utilize a scoring system to determine the priority score based on one or more characteristics of previous service interactions (e.g., occurrences of a particular type of self-service interaction and/or usage of a provider system that is indicative of a self-service capability score or rating), characteristics of one or more event records (e.g., characteristics indicating a degree of fraud risk and/or one or more characteristics that are indicative of a degree of adverse risk to a standing of the user account), and/or one or more characteristics associated with the account information (e.g., a customer score or rating). Using such a scoring system, the request management module can apply weights (w) to parameters corresponding to the priority factors that are used to determine the priority score. Accordingly, the request management module can determine (e.g., via one or more calculations associated with the scoring system) priority scores for a set of priority factors (e.g., priority factors that have been determined or can be determined for the user account). For example, the request management module can use the following to determine the score ($s_{ij}$) based on three priority factors a, b, c of a user account i for a provider system j:

$$S_{ij}=W_{aj}a_i+W_{cj}b_i+W_{cj}c_i \qquad (1)$$

where $w_{aj}$, $w_{bj}$, $w_{cj}$ correspond to adjusted weights based on the relevance to the provider system j for parameters $a_i$, $b_i$, $c_i$ that correspond to the priority factors of the user account i. For example, parameters $a_i$, $b_i$, $c_i$ may include respective values (e.g., priority factor-specific scores) associated with a scale for the respective characteristics associated with parameters $a_i$, $b_i$, $c_i$. Additionally, or alternatively, the adjusted weights $w_{aj}$, $w_{bj}$, $w_{cj}$ may be normalized (e.g., where $0 \le W_{aj}$, $W_{bj}$, $W_{cj} \le 1$ and $W_{aj}$, $W_{bj}$, $W_{cj}=1$). Additionally, or alternatively, a similar scoring system may be configured according to a particular type of service (e.g., the requested service) (where j in Equation 1 corresponds to a service type).

Accordingly, as described above, the priority score may be determined based on one priority factor and/or another priority factor that are indicative of an ability of User A to engage in the service interaction via a type of interface of a particular provider system, indicative of a degree of fraud risk involving the user, and/or indicative of a degree of adverse risk to a standing of the user account that is determined based on one or more characteristics of at least one of the one or more event records, among other examples (e.g., customer relationship, business value, and so on).

As further shown in FIG. 2B, and by reference number 250, the service management system selects a provider system and/or a queue location based on one or more of the priority factors. For example, the request management module may utilize the priority score (and/or one or more individual priority factors) to select a queue (e.g., a queue of a particular provider system) and/or a queue location of the queue (e.g., according to how User A is to be prioritized among other users at other locations within the queue). The request management module may use any suitable technique for selecting a queue and/or a queue location of a provider system to permit the user to utilize the provider system to facilitate a service interaction. For example, the request management module may use a mapping of priority scores for a particular provider system and/or priority factors for the provider system to corresponding queue locations to identify the queue location for a service interaction.

The queue location of a queue may correspond to one or more resources of a corresponding provider system associated with the queue that are to be reserved in order to facilitate the user interaction via the queue. For example, as shown, there are five provider systems. Each of the provider systems illustrated in FIG. 2B has five queue locations. Available queue locations are shown with a dash "-" and reserved queue locations are shown with an "X." Furthermore, the queues of the plurality of queues associated with five provider systems may be associated with different interfaces. More specifically, provider system 1 is associated with an application, provider system 2 is associated with a kiosk, provider system 3 is associated with a first branch, provider system 4 is associated with a voice interface, and provider system 5 is associated with a second branch (which may include the same or a different set of interfaces as the first branch).

In some implementations, the queue location may be selected based on a particular priority factor. For example, the request management module may select a queue location of a voice call and/or a branch meeting based on a self-service capability priority factor indicating that User A is more capable of using the particular type of interface (e.g., a voice communication or conversation in the branch) than another interface that is associated with the other queues or provider systems (e.g., other self-service type provider systems, such as an application and/or a kiosk).

As another example, the request management module in example implementation 200 may select, based on a self-service capability (e.g., a first priority factor), a queue associated with a provider system that is configured to facilitate the service interaction (e.g., without a customer service representative). For example, the request management module may select the queue because the self-service capability indicates an ability of the user to utilize a particular type of interface that is configured to facilitate the service interaction involving the user. As described elsewhere herein, the self-service capability is determined based on account activity information of the User Account A indicating that User A previously utilized the particular type of interface during one or more of the previous service interactions. On the other hand, the request management module may select a queue based on another priority factor (e.g., a second priority factor, such as a degree of fraud risk associated with User Account A and/or a degree of adverse risk to a standing of one of the accounts of User Account A).

Accordingly, as described herein, the request management module may select the provider system and/or the queue location that is to be reserved to permit User A to engage in the service interaction. In this way, based on the selected provider system and/or queue location, the service management system may perform an action associated with causing the provider system to facilitate the service interaction according to the queue location. For example, the service management system may provide a message, a notification, and/or instructions to the provider system that automatically (e.g., without assistance from User A or a service representative of the service provider) cause the provider system, associated with the queue, to facilitate the service interaction according to the queue location.

As further shown in FIG. 2B, and by reference number 260, the service management system provides, to the user device, one or more options to receive the service. For example, the service management system may send a service interaction notification that identifies one or more of the queue locations and one or more of the provider systems that are available to facilitate the service interaction (e.g., according to the priority factor(s) and/or the priority score).

In some implementations, the service management system may send a feedback request associated with a selected queue location and/or a selected provider system. For example, the feedback request may solicit User A to indicate whether a requested, suggested, and/or assigned queue location and/or provider system is accessible to the user (e.g., based on what the user indicated or provided in the service request). In some implementations, the service management system may provide multiple options for selection via the user device (or via an application of the user device) based on the user device sending the request and/or based on the self-service capability score indicating that User A is capable of providing feedback via the user device.

As shown in FIG. 2C, and by reference number 270, the service management system may receive a user selection. For example, the user selection may correspond to a response to the feedback request. The response may include feedback that confirms that a selected or indicated queue location or a selected or indicated provider system is acceptable (to User A) for facilitating the service interaction. Accordingly, the user selection may identify one or more of the provided options for a queue location and/or a provider system.

As further shown in FIG. 2C, and by reference number 280, the service management system may schedule a service interaction and/or the queue locations of the provider systems. For example, the service management system may send, to one or more of the provider systems, scheduling information that includes an identifier of the user account and/or that identifies the queue location. In this way, the service management system may provide, to a provider system, a scheduling notification that permits the provider system to schedule the service interaction (e.g., with User A) according to the queue location.

In some implementations, the service management system may schedule the service interaction and/or reserve the queue location (e.g., one or more resources of the provider system) based on receiving the user selection. Additionally, or alternatively, the service management system may schedule the service interaction and/or reserve the queue location automatically (e.g., without receiving a user selection and/or requesting User A to select an option for receiving the service).

As further shown in FIG. 2C, and by reference number 290, the service management system updates the user profile information. For example, the service management system may update the service log to indicate which service interaction was selected by the user, scheduled, and/or performed (e.g., by the user and/or using a corresponding selected provider system). In this way, the service management system may maintain additional information to permit the service management system to identify a preferred provider system for providing a service and/or determine an ability of User A to perform a self-service operation to receive the service (e.g., without a service interaction with a service representative).

Accordingly, as described herein, the service management system enables management of one or more queues of a provider system based on one or more user specific characteristics (or capabilities) and/or based on one or more conditions of a user account of a user. In this way, the service management system may more quickly and efficiently process and/or execute service requests and/or corresponding service interactions to permit the service management system to conserve resources and/or costs while preventing waste associated with scheduling service interactions via provider systems that are not conducive to providing a service for a requesting user.

As indicated above, FIGS. 2A-2C are provided as an example. Other examples may differ from what is described with regard to FIGS. 2A-2C. The number and arrangement of devices shown in FIGS. 2A-2C are provided as an example. In practice, there may be additional devices, fewer devices, different devices, or differently arranged devices than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) shown in FIGS. 2A-2C may perform one or more functions described as being performed by another set of devices shown in FIGS. 2A-2C.

Figure 3:
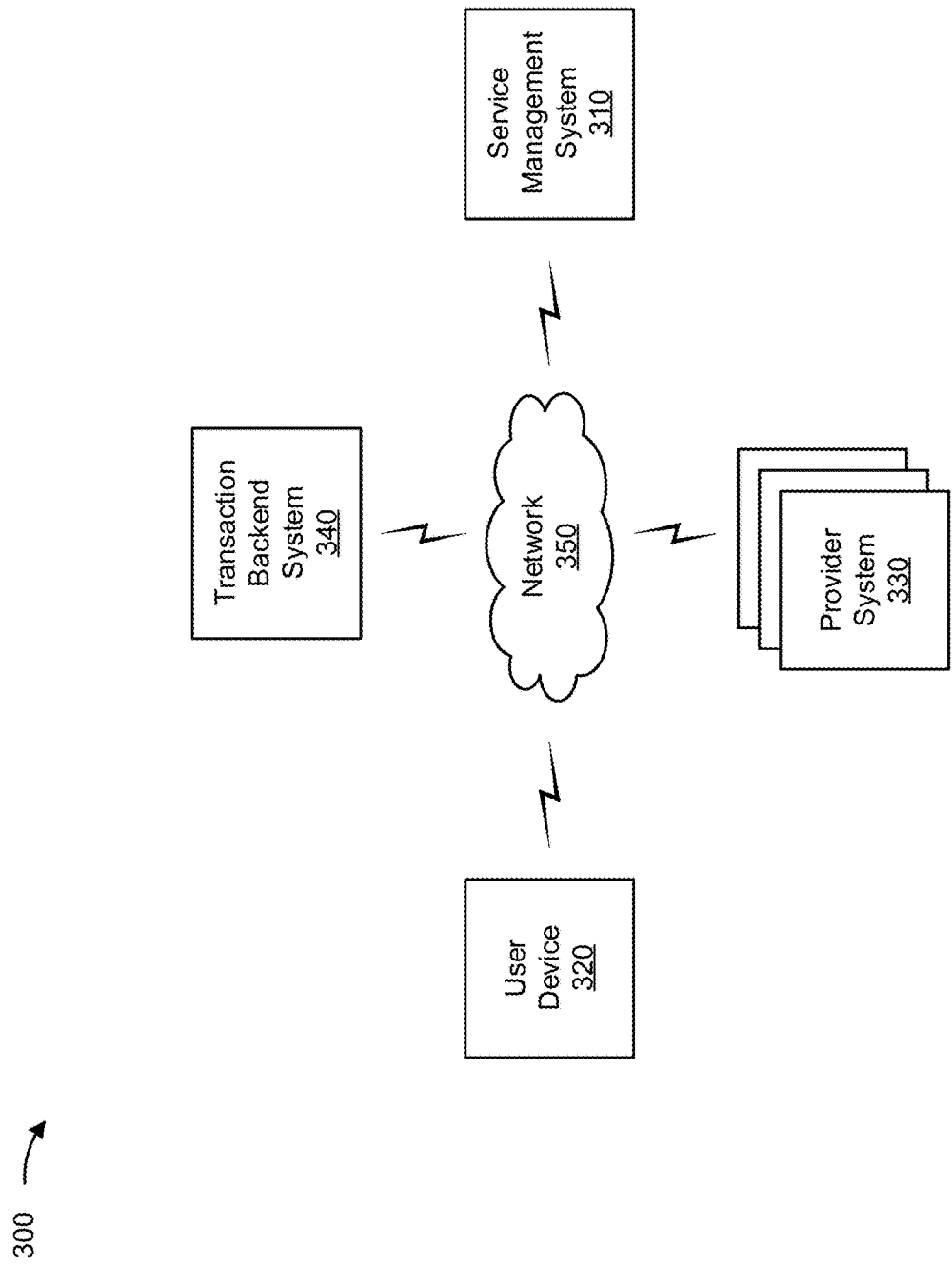
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a service management system 310, a user device 320, a provider system 330, a transaction backend system 340, and a network 350. Devices of environment 300 may interconnect via wired connections, wireless connections, or a combination of wired and wireless connections.

The service management system 310 includes one or more devices capable of receiving, generating, storing, processing, providing, and/or routing information associated with facilitating a service and/or service interaction, as described elsewhere herein. The service management system 310 may include a communication device and/or a computing device. For example, the service management system 310 may include a server, such as an application server, a client server, a web server, a database server, a host server, a proxy server, a virtual server (e.g., executing on computing hardware), or a server in a cloud computing system. In some implementations, the service management system 310 includes computing hardware used in a cloud computing environment.

The user device 320 includes one or more devices capable of receiving, generating, storing, processing, and/or providing information associated with a service request (and/or service interaction request) and/or information associated with an application associated with the user account, as described elsewhere herein. The user device 320 may include a communication device and/or a computing device. For example, the user device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The provider system 330 includes one or more devices capable of receiving, generating, storing, processing, providing, and/or routing information associated with hosting a service interaction and/or facilitating a service interaction, as described elsewhere herein. The provider system 330 may include a communication device and/or a computing device. For example, the provider system 330 may include a server, such as an application server, a client server, a web server, a database server, a host server, a proxy server, a virtual server (e.g., executing on computing hardware), or a server in a cloud computing system. In some implementations, the provider system 330 includes computing hardware used in a cloud computing environment.

The transaction backend system 340 includes one or more devices capable of processing, authorizing, and/or facilitating a transaction. For example, the transaction backend system 340 may include one or more servers and/or computing hardware (e.g., in a cloud computing environment or separate from a cloud computing environment) configured to receive and/or store information associated with processing an electronic transaction. The transaction backend system 340 may process a transaction, such as to approve (e.g., permit, authorize, or the like) or decline (e.g., reject, deny, or the like) the transaction and/or to complete the transaction if the transaction is approved. The transaction backend system 340 may process the transaction based on information received from a transaction terminal, such as transaction data (e.g., information that identifies a transaction amount, a merchant, a time of a transaction, a location of the transaction, or the like), account information communicated to the transaction terminal by a transaction device (e.g., a transaction card, a mobile device executing a payment application, or the like) and/or information stored by the transaction backend system 340 (e.g., for fraud detection).

The transaction backend system 340 may be associated with a financial institution (e.g., a bank, a lender, a credit card company, or a credit union) and/or may be associated with a transaction card association that authorizes a transaction and/or facilitates a transfer of funds. For example, the transaction backend system 340 may be associated with an issuing bank associated with the transaction device, an acquiring bank (or merchant bank) associated with the merchant and/or the transaction terminal, and/or a transaction card association (e.g., VISA® or MASTERCARD®) associated with the transaction device. Based on receiving information associated with the transaction device from the transaction terminal, one or more devices of the transaction backend system 340 may communicate to authorize a transaction and/or to transfer funds from an account associated with the transaction device to an account of an entity (e.g., a merchant) associated with the transaction terminal.

The network 350 includes one or more wired and/or wireless networks. For example, the network 350 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 350 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
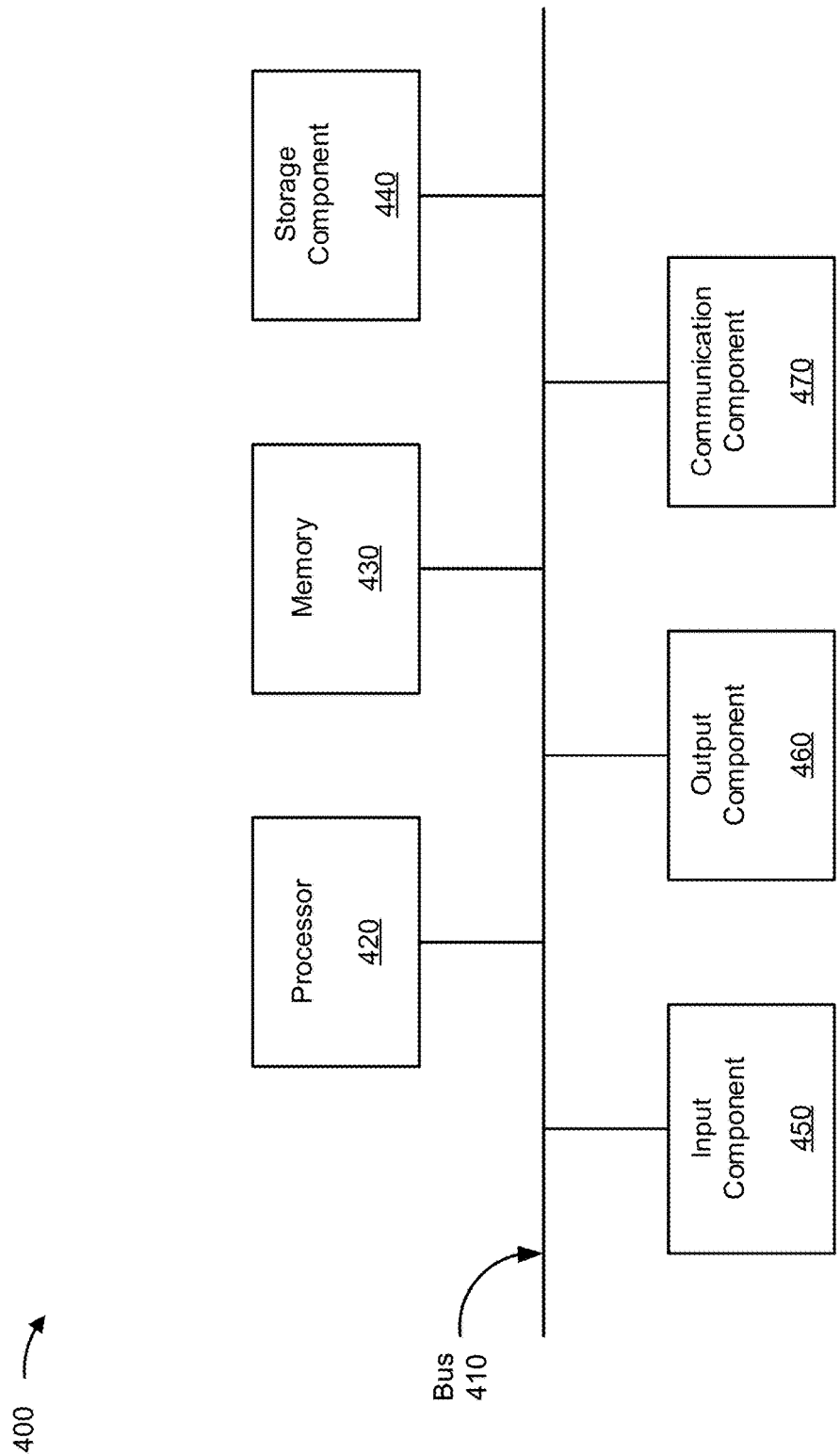
FIG. 4 is a diagram of example components of one or more devices of FIG. 3.

FIG. 4 is a diagram of example components of a device 400, which may correspond to the service management system 310, the user device 320, the provider system 330, and/or the transaction backend system 340. In some implementations, the service management system 310, the user device 320, the provider system 330, and/or the transaction backend system 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with a service management system for processing a request. In some implementations, one or more process blocks of FIG. 5 may be performed by a service management system (e.g., service management system 310). In some implementations, one or more process blocks of FIG. 5 may be performed by another device or a group of devices separate from or including the service management system, such as the user device 320, the provider system 330, and/or the transaction backend system 340. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include maintaining account activity information associated with one or more previous service interactions involving a user of a user account (block 510). As further shown in FIG. 5, process 500 may include determining, based on the account activity information, a priority factor associated with facilitating a service interaction involving the user. The priority factor may be indicative of an ability of the user to engage in the service interaction via a particular type of interface (block 520). As further shown in FIG. 5, process 500 may include receiving a request to facilitate the service interaction involving the user. The request may receive a request to facilitate the service interaction involving the user (block 530).

As further shown in FIG. 5, process 500 may include determining, based on the priority factor and the service information, a priority score associated with facilitating the service interaction (block 540). As further shown in FIG. 5, process 500 may include selecting, based on the priority score, a queue location of a queue. The queue may be used to facilitate service interactions with one or more other users via a provider system (block 550). As further shown in FIG. 5, process 500 may include performing an action associated with causing the provider system to facilitate the service interaction according to the queue location (block 560).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for managing a queue for providing a service, the system comprising:
   one or more memories; and
   one or more processors, coupled to the one or more memories, configured to:
      maintain account activity information associated with one or more previous service interactions involving a user of a user account, the account activity information corresponding to service interaction information stored in a service log indicative of a particular type of interface the user utilized during the one or more previous service interactions;
      determine, based on the account activity information, a priority factor associated with facilitating a service interaction involving the user,
         wherein the priority factor is indicative of an ability of the user to engage in the service interaction via the particular type of interface;
      receive a request to facilitate the service interaction involving the user,
         wherein the request includes service information that identifies a service type to be provided in association with the service interaction;
      determine, based on the priority factor and the service information, a priority score associated with facilitating the service interaction,
         wherein the priority score is determined by applying weights to at least one parameter corresponding to the priority factor, and
         wherein the weights are applied in accordance with the service type;
      select, based on the priority score, a queue location of the queue,
         wherein the queue is used to facilitate service interactions with one or more other users via a provider system; and
      perform an action associated with causing the provider system to facilitate the service interaction according to the queue location.

2. The system of claim 1, wherein the provider system is accessible via the particular type of interface.

3. The system of claim 1, wherein the particular type of interface includes an application of a user device.

4. The system of claim 1, wherein the priority score is determined based on another priority factor that is determined based on one or more event records associated with the user account, and
   wherein the other priority factor is indicative of a degree of fraud risk involving the user account that is determined based on one or more characteristics of at least one of the one or more event records.

5. The system of claim 1, wherein the priority score is determined based on another priority factor that is determined based on one or more event records associated with the user account, and
   wherein the other priority factor is indicative of a degree of adverse risk to a standing of the user account that is determined based on one or more characteristics of at least one of the one or more of the event records.

6. The system of claim 1, wherein the queue is one of a plurality of queues,
   wherein the queue and another queue, of the plurality of queues, are associated with different types of interfaces, and
   wherein the queue is selected based on the priority factor indicating that the user is more capable of using the particular type of interface than another interface that is associated with the other queue.

7. The system of claim 1, wherein the one or more processors, to perform the action, are configured to at least one of:
   send, to the provider system, scheduling information that includes an identifier of the user account and that identifies the queue location; and
   send a service interaction notification that identifies the queue location and the provider system.

8. The system of claim 1, wherein the one or more processors, to perform the action, are configured to:
   send, to a user device, a feedback request associated with the queue location and the provider system;
   receive, from the user device, feedback that confirms the queue location or the provider system; and
   send, to the provider system, a scheduling notification that includes an identifier of the user account and that identifies the queue location.

9. A method for managing a queue for providing a service, comprising:
   receiving, by a device, a request to facilitate a service interaction involving a user,
      wherein the request includes service information that identifies a service type to be provided in association with the service interaction;
   determining, by the device and based on receiving the request, a priority factor associated with facilitating the service interaction for the user,
      wherein the priority factor is indicative of an ability of the user to engage in the service interaction via a particular type of interface,
      wherein the priority factor is determined based on account activity information associated with a user account of the user, the account activity information corresponding to service interaction information indicative of a set of interface types the user utilized during one or more previous service interactions,
      wherein the priority factor is indicative of at least one of:
         a degree of fraud risk associated with one or more event records of the user account, or
         a degree of adverse risk to a standing of the user account;
   determining, by the device and based on the priority factor and the service information, a priority score associated with facilitating the service interaction,
      wherein the priority score is determined by applying weights to at least one parameter corresponding to the priority factor, and wherein the weights are applied in accordance with a scoring system configured according to the service type;

selecting, by the device and based on the priority score, a queue location of the queue,
wherein the queue is associated with a provider system that is configured to facilitate the service interaction; and performing, by the device, an action associated with causing the provider system to facilitate the service interaction according to the queue location.

10. The method of claim 9, wherein the priority score is determined based on another priority factor that is determined based on service interaction information that is associated with one or more previous service interactions involving the user, and
wherein the other priority factor is indicative of an ability of the user to engage in the service interaction via the particular type of interface of the provider system.

11. The method of claim 9, wherein the priority score is indicative of a priority that is to be assigned to the user in association with facilitating the service interaction via the provider system,
wherein the priority is relative to other users of the provider system, and
wherein the provider system is identified in the request.

12. The method of claim 9, wherein the queue is one of a plurality of queues, and
wherein the queue is selected based on at least one of:
the priority factor,
the service information, or
the priority score.

13. The method of claim 9, wherein performing the action comprises:
providing, to the provider system, a notification that includes an identifier of the user account and that identifies the queue location to permit the provider system to schedule the service interaction according to the queue location.

14. The method of claim 9, wherein performing the action comprises:
sending, to a user device, a feedback request associated with the queue location and the provider system;
receiving, from the user device, feedback that confirms the queue location or the provider system; and
sending, to the provider system, a scheduling notification that includes an identifier of the user account and that identifies the queue location.

15. A non-transitory computer-readable medium storing a set of instructions, the set of instructions comprising:
one or more instructions that, when executed by one or more processors of a device, cause the device to:
receive a request to facilitate a service interaction involving a user of a user account,
wherein a service provider is to provide the user with a service during the service interaction, and
wherein the request includes service information that identifies a service type to be provided via a particular type of interface associated with a service provider;
determine, based on previous service interactions involving the user corresponding to service interaction information stored in a service log indicative of a set of interface types the user utilized during the previous service interactions, a first priority factor for facilitating the service interaction, the first priority factor being specific to a provider system and determined based on the particular type of interface associated with the provider system;
determine, based on event records associated with the user account, a second priority factor for facilitating the service interaction, wherein the event records correspond to at least one occurrence of a transaction associated with the service provider;
select, based on the first priority factor, a queue associated with a provider system that is configured to facilitate the service interaction;
determine, based on the first priority factor and the second priority factor, a priority score associated with facilitating the service interaction,
wherein the priority score is determined by applying weights to a first parameter corresponding to the first priority factor and a second parameter corresponding to the second priority factor, and
wherein the weights are applied in accordance with the service type;
select, based on the priority score, a queue location of the queue; and
cause the provider system, associated with the queue, to facilitate the service interaction according to the queue location.

16. The non-transitory computer-readable medium of claim 15, wherein the first priority factor indicates an ability of the user to utilize the particular type of interface configured to facilitate the service interaction involving the user.

17. The non-transitory computer-readable medium of claim 15, wherein the first priority factor is further determined based on account activity information of the user account indicating that the user previously utilized the particular type of interface during one or more of the previous service interactions.

18. The non-transitory computer-readable medium of claim 15, wherein the second priority factor is indicative of a degree of fraud risk involving the user account that is determined based on a characteristic of at least one of the event records.

19. The non-transitory computer-readable medium of claim 15, wherein the second priority factor is indicative of a degree of an adverse risk to a standing of the user account that is determined based on a characteristic of at least one of the event records.

20. The non-transitory computer-readable medium of claim 15, wherein the one or more instructions, that cause the provider system to facilitate the service interaction, cause the device to:
send, to the provider system, a scheduling notification that includes an identifier of the user account and that identifies the queue location, or
send, to a user device, a service interaction notification that identifies the queue location and the provider system.

* * * * *